US006068298A

United States Patent [19]
Chen

[11] Patent Number: 6,068,298
[45] Date of Patent: May 30, 2000

[54] LOOSE-LEAF SHEET FOR A TRANSPARENCY STORAGE BOOK

[76] Inventor: Mu-Sheng Chen, 20 Fl.-2, No. 28, Pao-Ching Street, Tso-Ying Dist., Kaohsiung City, Taiwan

[21] Appl. No.: 09/361,796

[22] Filed: Jul. 27, 1999

[30] Foreign Application Priority Data

Jul. 19, 1997 [TW] Taiwan ................................ 86212114

[51] Int. Cl.[7] ................................ B42D 1/00; G03B 21/11

[52] U.S. Cl. ................................ 281/38; 402/79; 281/45; 353/120

[58] Field of Search ................................ 402/79; 281/38, 281/45; 353/120

[56] References Cited

U.S. PATENT DOCUMENTS

| | | | |
|---|---|---|---|
| 3,544,211 | 12/1970 | Albee, Jr. | 353/120 |
| 4,402,585 | 9/1983 | Gardlund | 353/120 |
| 4,925,720 | 5/1990 | Hansen | 428/77 |
| 4,940,353 | 7/1990 | Osono et al. | 402/79 |
| 5,568,210 | 10/1996 | Kiehne et al. | 353/120 |
| 5,669,689 | 9/1997 | Zeifang | 353/120 |
| 5,722,694 | 3/1998 | Baldursson | 283/116 |
| 5,806,894 | 9/1998 | Dottel | 281/38 |
| 6,012,866 | 1/2000 | Podosek | 281/38 |
| 6,022,111 | 2/2000 | Carls | 353/120 |

*Primary Examiner*—Willmon Fridie, Jr.
*Assistant Examiner*—Alisa L Thurston
*Attorney, Agent, or Firm*—Ladas & Parry

[57] ABSTRACT

A loose-leaf sheet for a transparency storage book is formed from a single paper sheet, and has a transparency receiving side, a binding side, a clamping side, and a blocking side. The clamping side is folded along a first fold line to form a clamping strip. The blocking side is folded along a second fold line to form a blocking strip. The binding side is folded along a third fold line to form a binding strip unit, which is formed with a plurality of binding holes. A transparency for projector use can be inserted into the sheet through the transparency receiving side, and is clamped on the clamping side. The binding strip unit, the clamping strip and the blocking strip are arranged in a U-shape, within which the transparency is confined.

4 Claims, 2 Drawing Sheets

LOOSE-LEAF SHEET FOR A TRANSPARENCY STORAGE BOOK

BACKGROUND OF THE INVENTION

1. Field of the Invention

This invention relates to a transparency storage book for holding a plurality of transparencies for projector use, more particularly to a loose-leaf sheet for a transparency storage book.

2. Description of the Related Art

Referring to FIG. 1, a conventional loose-leaf sheet 1 is shown to include a transparent pocket 11 with an upper opening 111, and a binding strip unit 12, which is formed with a plurality of binding holes 121. A transparency 13 is inserted into the pocket 11 through the opening 111. The sheet 1 suffers from the following disadvantages:

(1) When the transparency 13 is placed within the sheet 1, and when the sheet 1 is positioned in a loose-leaf book (not shown), patterns and/or words on the transparency 13 cannot be seen clearly. A thin paper sheet (not shown) is therefore inserted into the pocket 11 behind the transparency 13 to facilitate visual inspection of the transparencies in the book (not shown), thereby making the transparency 13 and the paper (not shown) difficult to be inserted into and removed from the pocket 11 due to the fact that static electricity occurs between any adjacent pair of the transparency 13, the paper sheet (not shown), and the pocket 11.

(2) When projected onto a screen (not shown) by a projector (not shown), the patterns and/or words on the transparency 13, which is enclosed within the pocket 11 with no paper sheet inserted into the pocket 11, cannot be seen clearly in view of the condition that the light-permeability of the pocket 11 is relatively low.

(3) Because the pocket 11 is made of polyester, which cannot absorb water, when moisture is left between the transparency 13 and the pocket 11, the patterns and/or words on the transparency 13 will be printed on the pocket 11 due to contact between the transparency 13 and the pocket 11, thereby resulting in reduced clarity.

(4) After the plastic pocket 11 is thrown away, it results in an environmental waste problem.

Referring to FIG. 2, another conventional loose-leaf sheet 2 is shown to include a pocket 21 that is formed with an opening 211, and a binding strip unit 22 that is formed with a plurality of binding holes 221. The sheet 2 is similar to the sheet 1 in construction except that the pocket 21 is made of a high-light-permeability material. Although the assembly of the pocket 21 and the transparency 23 can be placed directly onto a projector (not shown) so that patterns and/or words on the transparency 23 can be seen more clearly on a screen, the sheet 2 has the same disadvantages, when compared to that shown in FIG. 1.

SUMMARY OF THE INVENTION

An object of this invention is to provide a loose-leaf sheet for a transparency storage book, which does not cause environmental waste problem when disposed.

Another object of this invention is to provide a loose-leaf sheet for a transparency storage book, in which patterns and/or words on the transparency cannot be transferred by printing on the loose-leaf sheet due to contact between the transparency and the loose-leaf sheet.

Still another object of this invention is to provide a loose-leaf sheet for a transparency storage book, which is constructed so that a transparency can be easily inserted into and removed from the look-leaf sheet.

According to this invention, a rectangular loose-leaf sheet for a transparency storage book is adapted to hold a transparency thereon. The loose-leaf sheet is formed from a single paper sheet, and has a transparency receiving side, a binding side with a binding strip unit that has at least one binding hole, a clamping side that is formed with a first fold line, and a blocking side. The blocking side is adjacent to the clamping side, and is formed with a second fold line that is perpendicular to the first fold line. A rectangular sheet portion is defined among the transparency receiving side, the binding side, the first fold line and the second fold line. The clamping side is folded inwardly along the first fold line to form a clamping strip, and is adapted to clamp the transparency between the rectangular sheet portion and the clamping strip. The blocking side is folded inwardly along the second fold line to form a blocking strip that is adapted to prevent slipping of the transparency outwardly from the blocking side. Accordingly, the binding strip unit, the clamping strip and the blocking strip are arranged in a U-shape, which is adapted to confine the transparency therein. The clamping side may be opposite or adjacent to the binding side. Preferably, the binding side is formed with a third fold line, and is folded inwardly along the third fold line into two superposed layers that constitute the binding strip unit.

BRIEF DESCRIPTION OF THE DRAWINGS

These and other features and advantages of the invention will become apparent in the following detailed description of the preferred embodiments, with reference to the accompanying drawings, in which.

DETAILED DESCRIPTION OF THE PREFERRED EMBODIMENTS

Figure 3:
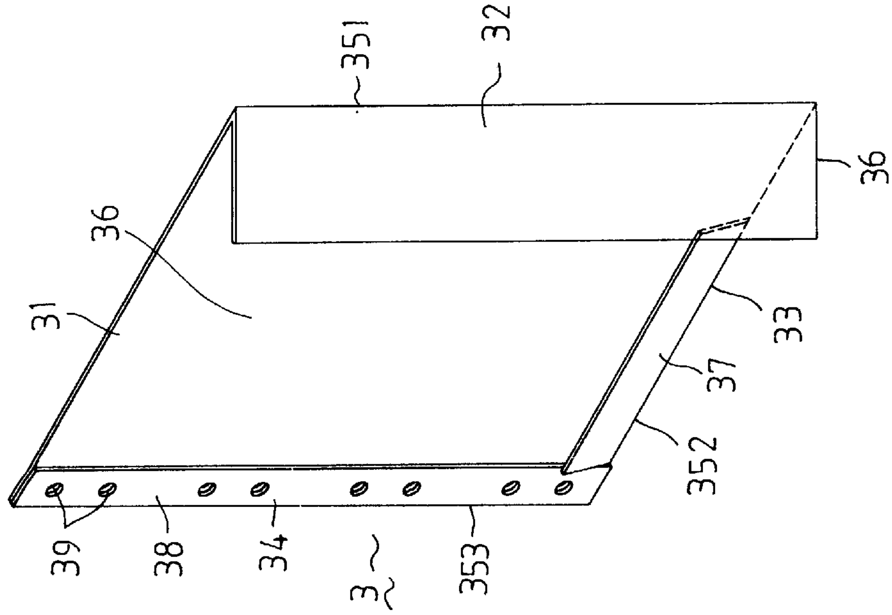
FIG. 3 is a perspective view of a preferred embodiment of a loose-leaf sheet for a transparency storage book according to this invention.

Referring to FIG. 3, a preferred embodiment of a rectangular loose-leaf sheet 3 for a transparency storage book according to this invention is shown. The sheet 3 is adapted to hold a transparency (not shown) for projector use, and has a transparency receiving side 31, a clamping side 32, a blocking side 33 and a binding side 34.

In consideration of environmental protection, the sheet 3 is formed from a single paper sheet, which has a first fold line 351, a second fold line 352, and a third fold line 353. A rectangular sheet portion 36 is defined among the transparency receiving side 31, the binding side 34, the first fold line 351, and the second fold line 352.

The clamping side 31 is opposite to the binding side 34, and is folded inwardly along the first fold line 341 to form a clamping strip 36. The blocking side 33 is folded inwardly along the second fold line 352 to form a blocking strip 37. The binding side 34 is folded inwardly along the third fold line 353 into two superposed layers, which constitute a binding strip unit 38 that is formed with a plurality of binding holes 39. Preferably, the binding strip unit 38 is provided with a plurality of reinforcing rings (not shown), which are fixed respectively within the binding holes 39 and which are available in most stationery stores.

In use, the transparency (not shown) is inserted into the sheet 3 through the transparency receiving side 31, and overlaps the rectangular sheet portion 36. The clamping strip 36, the blocking strip 37 and the binding strip unit 38 are arranged in a U-shape, within which the transparency (not shown) is confined. In a situation where the sheet 3 is sandwiched between another loose-leaf and a book cover or between another two loose-leaf sheets, the transparency (not shown) is clamped between the clamping strip 36 and the rectangular sheet portion 36. The user can writes notes on an outer surface of the clamping strip 36. The blocking strip 37 may be adhered to the rectangular sheet portion 36. In this way, slipping of the transparency (not shown) outwardly from the blocking side 33 can also be prevented by the blocking strip 37.

Figure 2:
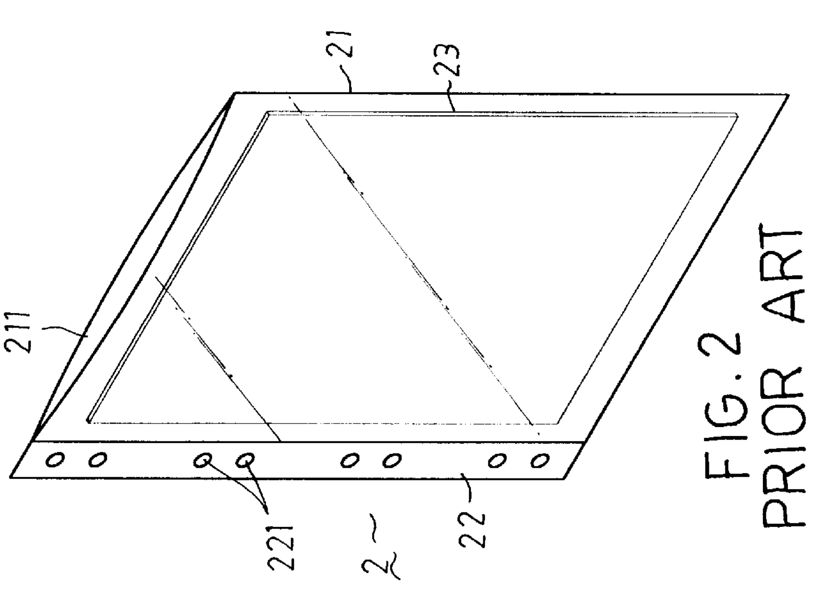
FIG. 2 PRIOR ART
FIG. 2 is a perspective view of another conventional loose-leaf sheet for a transparency storage book, which holds a transparency for projector use.
Figure 1:
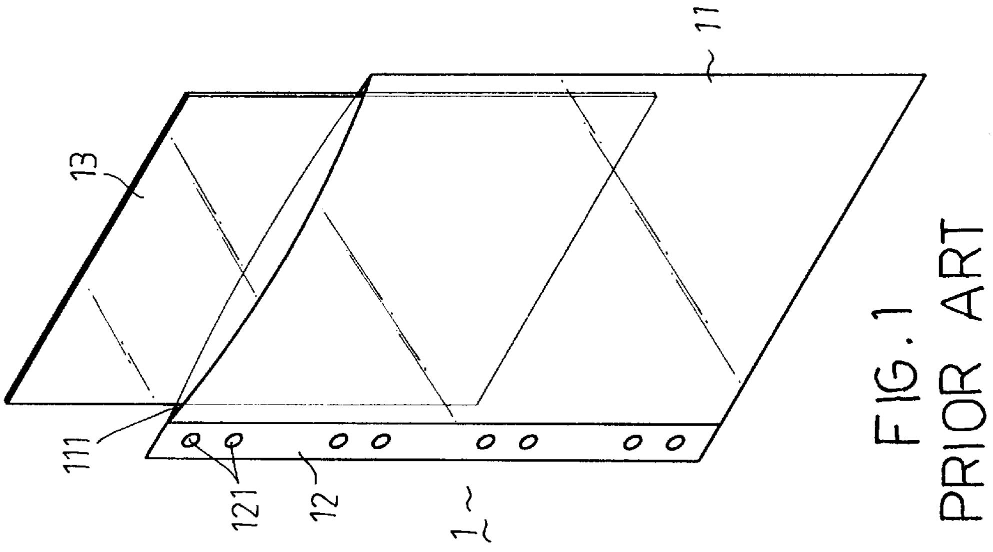
FIG. 1 PRIOR ART
FIG. 1 is a perspective view of a conventional loose-leaf sheet for a transparency storage book, which holds a transparency for projector use.
Figure 4:
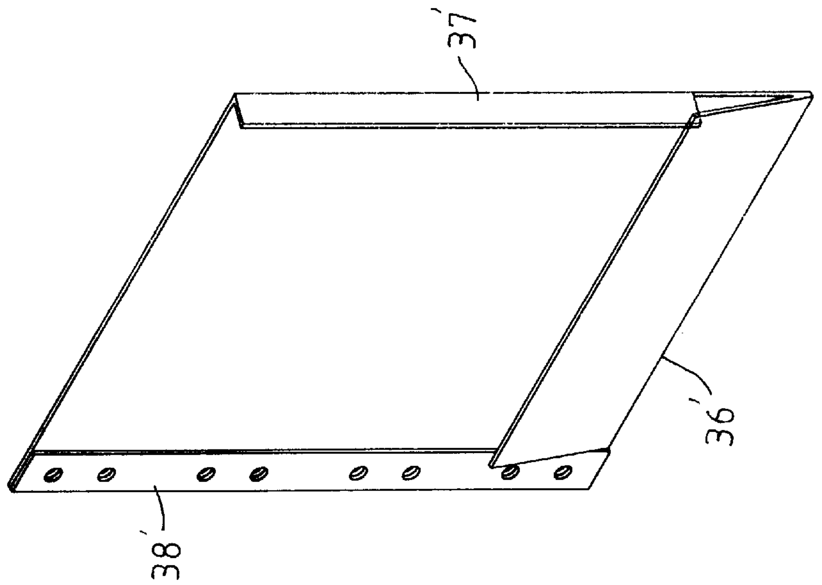
FIG. 4 is a perspective view of another preferred embodiment of a loose-leaf sheet for a transparency storage book according to this invention.

Alternatively, the positions of the clamping strip 36 and the blocking strip 37 relative to the binding side 38 can be interchanged to form the structure shown in FIG. 4, in which a clamping strip 36' is adjacent to a binding side 38' and a blocking side 37'.

It can be appreciated that the transparency (not shown) can be easily inserted into and removed from the sheet of this invention. Furthermore, because the sheet of this invention is made of paper, it can absorb moisture, thereby avoiding printing of patterns and/or words from the transparency onto the sheet. As such, the patterns and/or words on the transparency can be kept clear for a relatively long time.

With this invention thus explained, it is apparent that numerous modifications and variations can be made without departing from the spirit and scope of this invention. It is therefore intended that this invention be limited only as indicated by the appended claims.

I claim:

1. A rectangular loose-leaf sheet for a transparency storage book, said loose-leaf sheet being adapted to hold a transparency thereon and having a binding strip unit with at least one binding hole formed therethrough, wherein the improvement comprises said loose-leaf sheet is formed from a single paper sheet, and has a transparency receiving side, a binding side that is formed with said binding strip unit, a clamping side that is formed with a first fold line, and a blocking side, which is adjacent to said clamping side and which is formed with a second fold line that is perpendicular to said first fold line, thereby defining a rectangular sheet portion among said transparency receiving side, said binding side, said first fold line and said second fold line, said clamping side being folded inwardly along said first fold line to form a clamping strip and being adapted to clamp said transparency between said rectangular sheet portion and said clamping strip, said blocking side being folded inwardly along said second fold line to form a blocking strip that is adapted to prevent slipping of said transparency outwardly from said blocking side, whereby said binding strip unit, said clamping strip and said blocking strip are arranged in a U-shape, which is adapted to confine said transparency therein.

2. A rectangular loose-leaf sheet as claimed in claim 1, wherein said clamping side is opposite to said binding side.

3. A rectangular loose-leaf sheet as claimed in claim 1, wherein said clamping side is adjacent to said binding side.

4. A rectangular loose-leaf sheet as claimed in claim 1, wherein said binding side is formed with a third fold line, and is folded inwardly along said third fold line into two superposed layers that constitute said binding strip unit.

* * * * *